Patented Sept. 19, 1922.

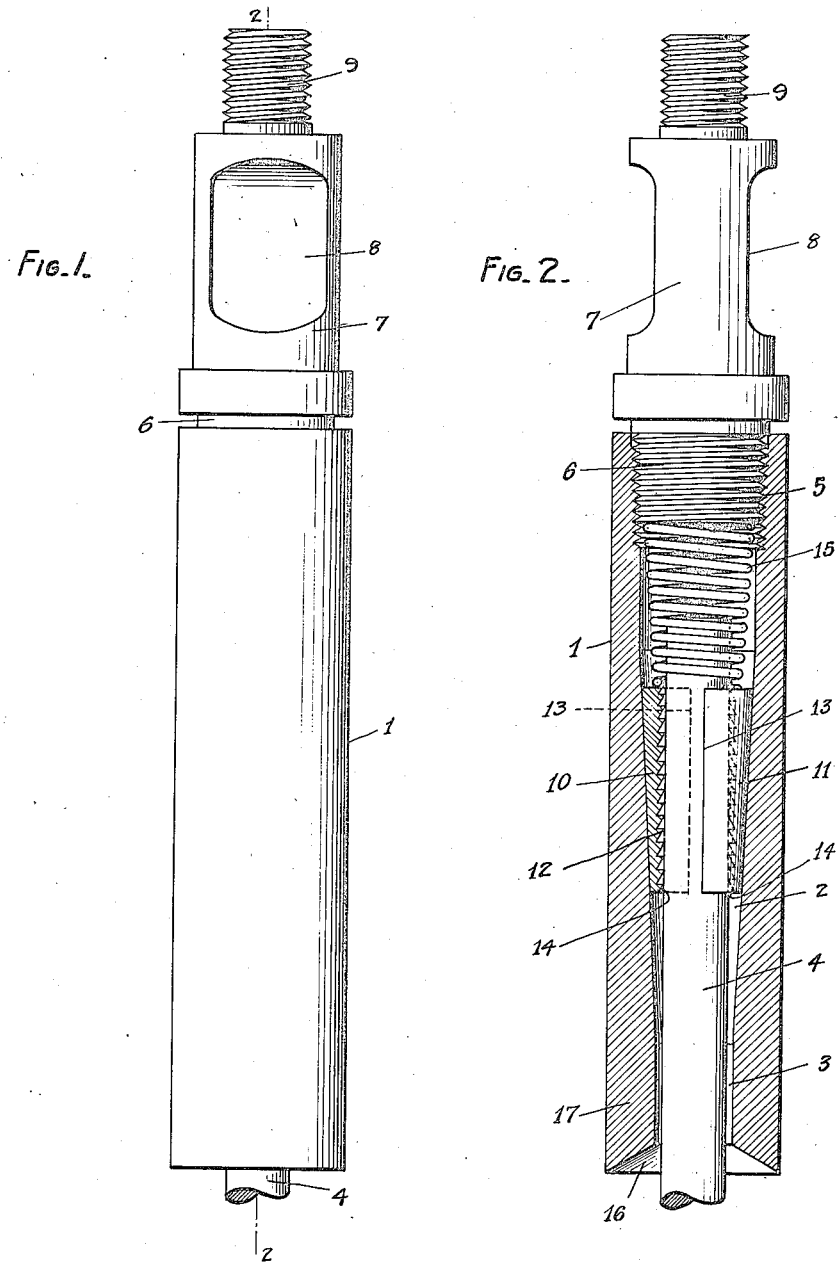

1,429,263

UNITED STATES PATENT OFFICE.

JOHN A. WOLFE, OF TULSA, OKLAHOMA.

DEEP-WELL FISHING TOOL.

Application filed May 6, 1921. Serial No. 467,480.

*To all whom it may concern:*

Be it known that JOHN A. WOLFE, a citizen of the United States, residing at Tulsa, in the county of Tulsa and State of Oklahoma, has invented a new and useful Deep-Well Fishing Tool, of which the following is a specification.

This invention has reference to fishing tools for use in deep oil or gas wells for the engagement and extraction of broken rods when such occur. In accordance with the invention, there is provided a socket to be screwed upon the end of a drill or other rod, and this socket has a tapered bore terminating at an appropriate distance from the lower end of the socket in a straight bore of a size to receive a broken or worn sucker rod. Within the socket are lodged two opposed slips of sufficient length and exteriorly tapered to wedge in the tapered bore formed in the socket, and of sufficient length to hold a tapered spiral spring which latter engages and provides an elastic backing for the slips, causing them to yield along the tapered socket accommodating the slips and to firmly grip the end of a rod entering between the slips whereby the engaged end of the rod is firmly held as it is lifted from the well.

The invention is characterized by the employment of the coiled spiral spring and the two long tapering slips lodged in the tapering bore of the fishing tool, with the terminal or lower end of the bore of the fishing tool straight, and of such length that the slips cannot enter such straight portion.

The invention provides a socket of materially heavy form at the base, and one which will not let the slips pull down through the hole at the bottom of the tool, and, moreover, one which will catch a much smaller worn rod than other forms of socket.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention, as expressed in the accompanying claim.

In the drawings:—

Fig. 1 is an elevation of a fishing tool constructed in accordance with the invention.

Fig. 2 is a longitudinal section on the line 2—2 of Fig. 1, of the fishing tool showing its application to the rod to be lifted, some parts of the structure being shown in elevation.

Referring to the drawings, there is shown a fishing tool body member 1 of exterior cylindrical shape, or substantially so, and having an interior tapered bore 2 axial thereof.

At the lower end of the bore 2, there is produced a straight bore 3 of a size to pass a rod 4, which may be considered as a broken or worn sucker rod, and which is located deep in the well and no longer joined to higher portions of the operating rod for the pump piston.

The tapered bore 2, which constitutes a long tapering bowl within the fishing tool, terminates at the upper end at an appropriate distance from and below the top of the fishing tool 1, and is interiorly threaded as shown at 5 to receive a screw nipple 6 on one end of a tool receiving plug 7 having oppositely flattened sides 8 to which a manipulating tool may be applied. That end of the plug 7 remote from the nipple 6 is provided with a screw stem 9 for insertion in a screw socket on the lower end of the tool manipulating rod. However, the screw socket and the rod carrying it are common devices and are not shown in the drawings.

Lodged in the long tapered bore 2 and adapted to be supported substantially midway between the ends of the bore and above the straight bore are taper slips 10, 11, with interior sloping or gripping teeth 12, and these slips have oppositely matching longitudinal edges 13. The bottom or smaller ends of the slips 10, 11, have terminal sloping guides 14 to receive the rod 4 and direct it between the teeth 12.

Lodged between the lower end of the nipple 6 and the upper ends of the slips 10 and 11, is a tapered spiral spring 15 long enough to compress when the body 1 is applied to the rod 4 and the latter rises between the gripping members 10 and 11 forcing them up the tapered bore so that longitudinal pressure is exerted upon the slips 10 and 11 forcing the teeth 12 into firm engagement with the walls of the rod 4. At the lower end the body member 1 has an inwardly tapered recess 16 leading from the outer edge of the body member into the bore 3, so that when the tool is lowered on to the rod, the latter will be guided by the recess 16 into the bore 3 and thence into the bore 2, ultimately rising to the lower inwardly tapered end of the slips 10 and 11, and finally rising along the inner surfaces of the slips provided with the gripping teeth 12 and possibly through the slips to a point above the upper ends thereof.

On reversing the movement of the fishing tool, so that it now moves upwardly, the engagement of the teeth 12 with the surface of the tool 4 and the reaction thereof on the tool, will tend to hold the slips 10 and 11 in exterior engagement with the rod 4, causing the teeth 12 to bite more firmly into the rod 4 as the weight of the rod 4 is felt.

In the body of the tool the straight bore 3 provides an elongated and relatively heavy base 17, through which the slips cannot pull down and damage the slips. Furthermore, the slips may approach materially closer without danger of pulling through than is the case with other forms of fishing tools, and therefore the tool will catch and hold a much smaller worn rod than will other types of fishing tools.

A tapered spring is employed to push the two slips downwardly to the lower end of the socket in order to grip a rod when worn. The lower end of the spring is of sufficient diameter to always engage the upper ends of the slips and maintain them in proper gripping relation with the rod regardless of the size of the rod used. Furthermore, the tapering of the spring permits the spring to slide freely within the tapered bore without binding, as would be the case were a cylindrical coiled spring employed.

The two slips reduce the number of gripping devices employed and increase the area of the grip upon the rod, and by making them of long tapering form not only is such gripping surface increased, but the area of contact of the slips with the bore is correspondingly increased and the thickness and strength of the walls of the bore are also increased, particularly where the greatest stresses occur.

What is claimed is:—

A fishing tool for deep wells, comprising a body member with an elongated tapered bore throughout the greater portion of its length, said bore decreasing in size toward the lower end and at a relatively short distance from the lower end merging into a straight bore, a pair of opposed and relatively long matching taper slips adapted to be supported by the tapered bore above the straight bore and provided with interior gripping teeth, a screw plug for entering the upper end of the body member, and a tapered coiled spring located between the screw plug and the top of the pair of slips, the body member having a thickness of base at the bottom of the tool such as to resist expansion of the bottom under forces tending to pull the slips out of the bottom and cause them to escape.

In testimony, that I claim the foregoing as my own I have hereto affixed my signature.

JOHN A. WOLFE.